(12) United States Patent
Pasquier et al.

(10) Patent No.: US 10,960,596 B2
(45) Date of Patent: Mar. 30, 2021

(54) FACILITY AND METHOD FOR PRODUCTION OF CONTAINERS, MAKING POSSIBLE PRODUCTION IMMEDIATELY UPON START-UP

(71) Applicant: SIDEL PARTICIPATIONS, Octeville-sur-Mer (FR)

(72) Inventors: Hervé Pasquier, Octeville-sur-Mer (FR); Yoann Lahogue, Octeville-sur-Mer (FR); Denis Souffes, Octeville-sur-Mer (FR); Guy Feuilloley, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 271 days.

(21) Appl. No.: 16/112,052

(22) Filed: Aug. 24, 2018

(65) Prior Publication Data
US 2019/0061225 A1 Feb. 28, 2019

(30) Foreign Application Priority Data
Aug. 24, 2017 (FR) ...................................... 1757857

(51) Int. Cl.
*B29C 49/78* (2006.01)
*H02P 1/02* (2006.01)
(Continued)

(52) U.S. Cl.
CPC .............. *B29C 49/78* (2013.01); *B29C 49/38* (2013.01); *B29C 49/6418* (2013.01);
(Continued)

(58) Field of Classification Search
CPC ........... B29C 2949/78991; B29C 2949/78571; B29C 2949/78546; B29C 2949/78;
(Continued)

(56) References Cited

U.S. PATENT DOCUMENTS 3,686,554 A * 8/1972 Getz ..................... H02P 7/2913
388/814
5,330,423 A * 7/1994 Holster .................. G05D 17/02
474/69
(Continued)

FOREIGN PATENT DOCUMENTS

EP 3119582 B1 6/2018
WO 2015/140424 A1 9/2015

OTHER PUBLICATIONS

FR Search Report, dated Apr. 13, 2018, from corresponding FR application No. 1757857.

*Primary Examiner* — Benjamin A Schiffman

(57) ABSTRACT

A facility for the production of containers from blanks, which facility includes: a forming unit equipped with a rotating carrousel driven by a motor; a unit for heating blanks, equipped with infrared emitters and a power feed for each emitter; a control unit having in the memory a nominal speed setpoint $\omega_N$ of the rotation of the carrousel and a nominal electrical power setpoint $P_N$. The control unit is programmed for: controlling the rotation of the carrousel according to the nominal speed setpoint $\omega_N$. During its acceleration: taking into account the real instantaneous speed $\omega$ of rotation of the carrousel, and regulating the electrical power of the feed to an instantaneous value P such that:

$$P(t) = P_N \cdot \frac{\omega}{\omega_N}$$

4 Claims, 5 Drawing Sheets

(51) Int. Cl.
*B29L 31/00* (2006.01)
*B29C 49/38* (2006.01)
*B29C 49/64* (2006.01)
*B29D 22/00* (2006.01)
B29K 67/00 (2006.01)
B29C 49/36 (2006.01)
B29C 49/68 (2006.01)
B29K 105/00 (2006.01)
B65G 43/00 (2006.01)
B65G 47/84 (2006.01)
B67C 7/00 (2006.01)
G05D 13/62 (2006.01)
G05D 17/02 (2006.01)

(52) U.S. Cl.
CPC ............ B29D 22/003 (2013.01); H02P 1/028 (2013.01); *B29C 49/36* (2013.01); *B29C 49/6472* (2013.01); *B29C 49/68* (2013.01); *B29C 2949/7826* (2013.01); *B29C 2949/78058* (2013.01); *B29C 2949/78546* (2013.01); *B29C 2949/78563* (2013.01); *B29C 2949/78773* (2013.01); *B29C 2949/78991* (2013.01); *B29K 2067/003* (2013.01); *B29K 2105/258* (2013.01); *B29L 2031/712* (2013.01); *B29L 2031/7158* (2013.01); *B65G 43/00* (2013.01); *B65G 47/84* (2013.01); *B65G 2201/0244* (2013.01); *B67C 7/004* (2013.01); *G05D 13/62* (2013.01); *G05D 17/02* (2013.01)

(58) Field of Classification Search
CPC ..... B29C 49/78; B29C 49/6418; B29C 49/64; B29C 49/36; B65G 47/84; H02P 1/028; G05D 13/62; G05D 17/02
See application file for complete search history.

(56) References Cited

U.S. PATENT DOCUMENTS

| | | | | |
|---|---|---|---|---|
| 6,761,263 | B2* | 7/2004 | Becker | B65G 43/00 198/502.4 |
| 8,302,767 | B2* | 11/2012 | Wilhelm | B67C 7/004 198/805 |
| 8,550,234 | B2* | 10/2013 | Breen | B65G 43/10 198/783 |
| 8,827,679 | B2* | 9/2014 | Giacobbe | F42C 19/08 425/162 |
| 8,921,808 | B2 | 12/2014 | Feuilloley et al. | |
| 9,902,105 | B2* | 2/2018 | Tanner | B29C 49/06 |
| 10,450,179 | B2* | 10/2019 | Sorbi | B65G 29/00 |
| 10,611,076 | B2* | 4/2020 | Haller | B29C 49/36 |
| 10,807,297 | B2* | 10/2020 | Santais | B29C 49/42 |
| 2008/0099961 | A1 | 5/2008 | Feuilloley et al. | |
| 2012/0080827 | A1 | 4/2012 | Senn et al. | |
| 2014/0145375 | A1 | 5/2014 | Feuilloley et al. | |
| 2017/0136682 | A1 | 5/2017 | Lahogue et al. | |
| 2019/0152123 | A1* | 5/2019 | Wolfe | B29C 49/12 |
| 2020/0076333 | A1* | 3/2020 | McElveen, Jr. | H02P 1/028 |
| 2020/0120973 | A1* | 4/2020 | Gamberini | A24C 5/327 |
| 2020/0269485 | A1* | 8/2020 | Takeuchi | G06F 3/04817 |

* cited by examiner

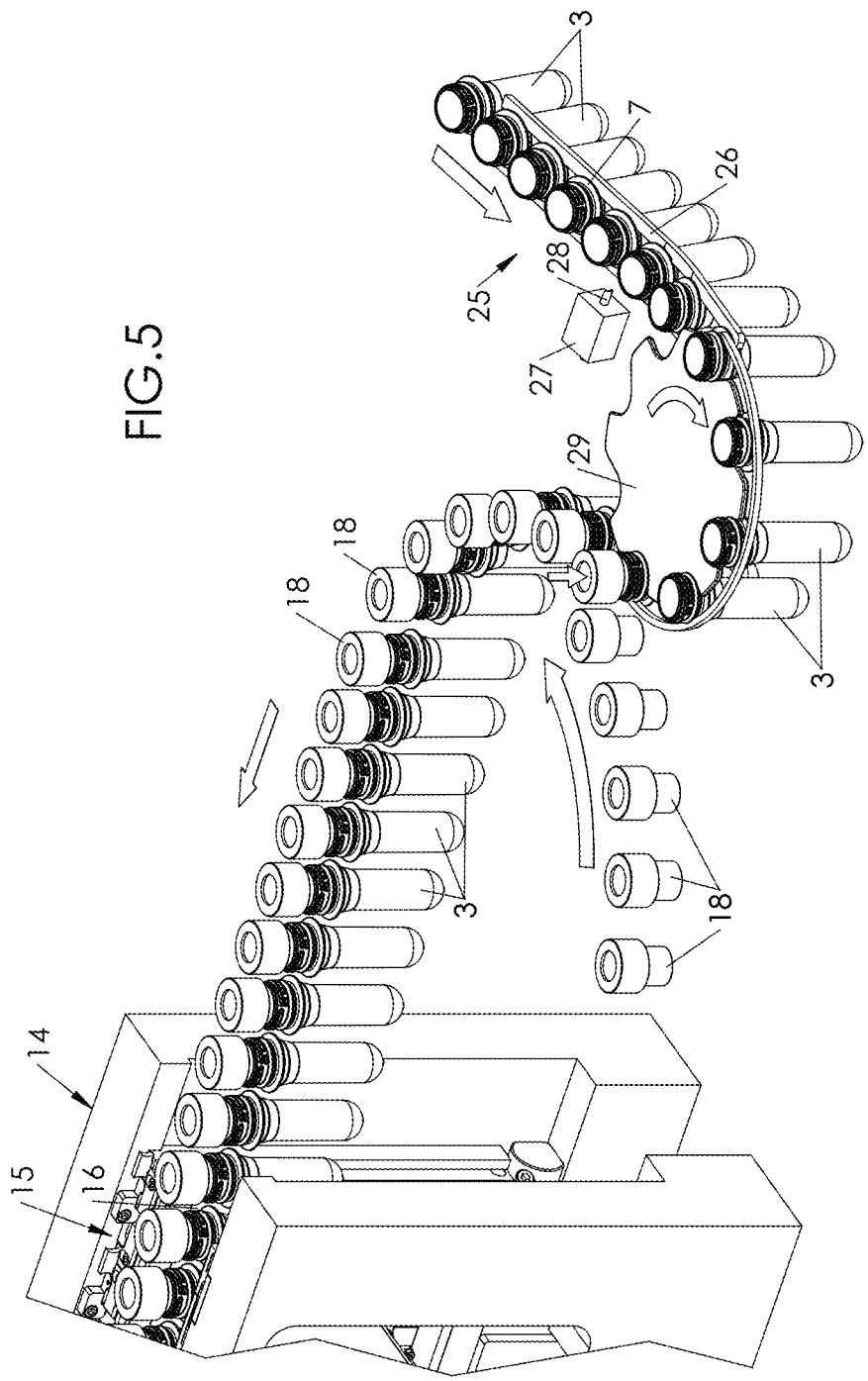

FACILITY AND METHOD FOR PRODUCTION OF CONTAINERS, MAKING POSSIBLE PRODUCTION IMMEDIATELY UPON START-UP

The invention relates to the production of containers from blanks made of plastic material (in particular of PET).

The term "blank" refers to:
A preform, i.e., a rough injection part that is equipped with a cylindrical body that extends, at a lower end, by a closed bottom and, at an upper end, by a neck whose shape is definitive, or
An intermediate container, obtained from operations (for example, preforming) performed on a preform and designed to undergo new operations to ultimately form a container.

The production of containers ordinarily comprises:
A first thermal conditioning phase (also called heating) of blanks, conducted within a heating unit (also called a furnace) that defines a heating cavity, with this first phase consisting in moving the preforms into the cavity to bring them to a temperature that is higher than the glass transition temperature of the material (which is, for PET, approximately 80° C.);
A second phase for forming containers from preforms, conducted within a forming unit that is equipped with molds bearing the impression of the model of the container that is to be formed, with this second phase consisting in introducing each hot preform into a mold and injecting a pressurized fluid (in particular a gas, typically air) into it to flatten it against the mold and thus to impart to it the impression of the container model.

The standard furnaces are equipped with halogen-type incandescent lamps, which radiate according to Planck's Law over a continuous spectrum.

Before launching any production, it is advisable to preheat the furnace in order, with the aid of lights, to raise it to an appropriate temperature that is suitable for imparting to the blanks a thermal profile that makes it possible subsequently to carry out the forming effectively.

This preheating is slow and requires delicate adjustments.

An alternative heating technology has been produced recently, however, based on the use of emitters equipped with monochromatic electromagnetic radiation sources (in particular lasers), whose emission spectrum essentially extends in the infrared range. A furnace that operates using this technology, illustrated by the European Patent Application EP3119582 (Sidel Participations), has numerous advantages in relation to a standard furnace with halogen lamps. Among other things, in this type of furnace:
The emitters radiate in the infrared without heat diffusion, which, unlike a halogen furnace, makes any ventilation useless;
The preforms can be heated according to more specific thermal profiles;
No preheating is necessary.

This last advantage is decisive in terms of productivity: in theory, it makes it possible to start up a production without preheating and therefore without a delay; it would actually be sufficient to activate the forming unit, to turn on the furnace (i.e., to supply the emitters with current) and to initiate the movement of the blanks.

This is not so simple in reality. A forming unit is a heavy machine with high inertia that, upon startup, follows a fairly long acceleration phase. During this start-up phase, the average speed at which the blanks move into the furnace is less than the nominal speed (achieved at a full rate). Starting up production without waiting for the full rate to be reached increases the blanks' time of exposure to the emitters' radiation.

This exposure time, however, determines the final temperature at which the blanks leave the furnace. However, the quality of a container depends in large part on the thermal profile acquired by the blank in the furnace. A blank that is too hot, in particular, leads to a misshapen container.

In the face of this difficulty, the U.S. Patent Application US2012/0080827 (Krones), in which the furnace is rotating and comprises individual heating stations, proposes a solution that consists in varying either the angle from which the heating begins, or the heating power (cf. [0054]).

However, apart from the fact that the heating of the blanks in individual heating stations is very different from the heating in a stream, this patent makes no mention regarding the manner in which it is advisable to implement the heating power or angle variations.

The object of the invention is to provide a true practical solution to the problem disclosed above by proposing a method and a facility that make it possible to start up the production of containers, on the one hand, without waiting for the forming unit to have reached its full rate, and, on the other hand, by maintaining the quality of the containers that are produced during the start-up phase at a reduced rate.

For this purpose, in the first place, a facility for the production of containers from blanks made of plastic material is proposed, which facility defines a travel path for blanks and containers and which comprises:
A forming unit equipped with a rotating carrousel driven by a motor and with a series of forming stations mounted on the carrousel and each including a mold bearing the impression of a container and a device for injection of a pressurized fluid into the blanks;
A unit for heating blanks, located on the travel path, upstream from the forming unit and defining a heating cavity, with this heating unit being equipped with:
A series of adjacent emitters bordering the cavity and with each comprising a number of monochromatic radiation sources that emit in the infrared,
A drive system of the blanks, synchronized with the carrousel and comprising a number of individual supports for the blanks;
A power feed providing each emitter with electrical power;
A control unit connected to the motor of the forming unit and to the feed of the heating unit, with this control unit having a memory in which the following are recorded: a nominal speed setpoint $\omega_N$ of the rotation of the carrousel and a nominal electrical power setpoint $P_N$, where both correspond to a nominal production rate, with this control unit being programmed, from a stopped configuration in which the carrousel is stationary:
For controlling the rotation of the carrousel according to the nominal speed setpoint $\omega_N$,
During the acceleration of the carrousel:
Taking into account a real instantaneous speed $\omega(t)$ of rotation of the carrousel,
Regulating the electrical power of the feed to an instantaneous value P(t) such that:

$$P(t) = P_N \cdot \frac{\omega(t-T)}{\omega_N}$$

where T is a positive real number or zero.

According to a particular embodiment, this facility comprises a device for feeding the heating unit with blanks, suitable for adopting an open state in which the passage of the blanks toward the heating unit is free, and a closed state in which the passage of the blanks toward the heating unit is blocked, and the control unit is programmed for:
- As long as the real speed of rotation of the carrousel is less than a threshold value of between 15% and 50% of the setpoint, keeping the feed device closed;
- As soon as the speed of rotation of the carrousel reaches the threshold value, controlling the opening of the feed device.

In the second place, a method for the production of containers from blanks made of plastic material, within a facility such as the one presented above, is proposed, which method comprises the following operations, from a stopped configuration of the facility, in which the carrousel is stationary:
- For controlling—by the control unit—the rotation of the carrousel according to the nominal speed setpoint $\omega_N$,
- During the acceleration of the carrousel:
    - Measuring a real instantaneous speed $\omega(t)$ of rotation of the carrousel,
    - Upon the command from the control unit, regulating the electrical power of the feed to an instantaneous value P(t) such that:

$$P(t) = P_N \cdot \frac{\omega(t-T)}{\omega_N}$$

Other objects and advantages of the invention will emerge from the description of an embodiment, given below with reference to the accompanying drawings, in which:

FIG. 5 is a view that is similar to FIG. 3, illustrating the operation of the production facility at a sustained level.

Figure 1:
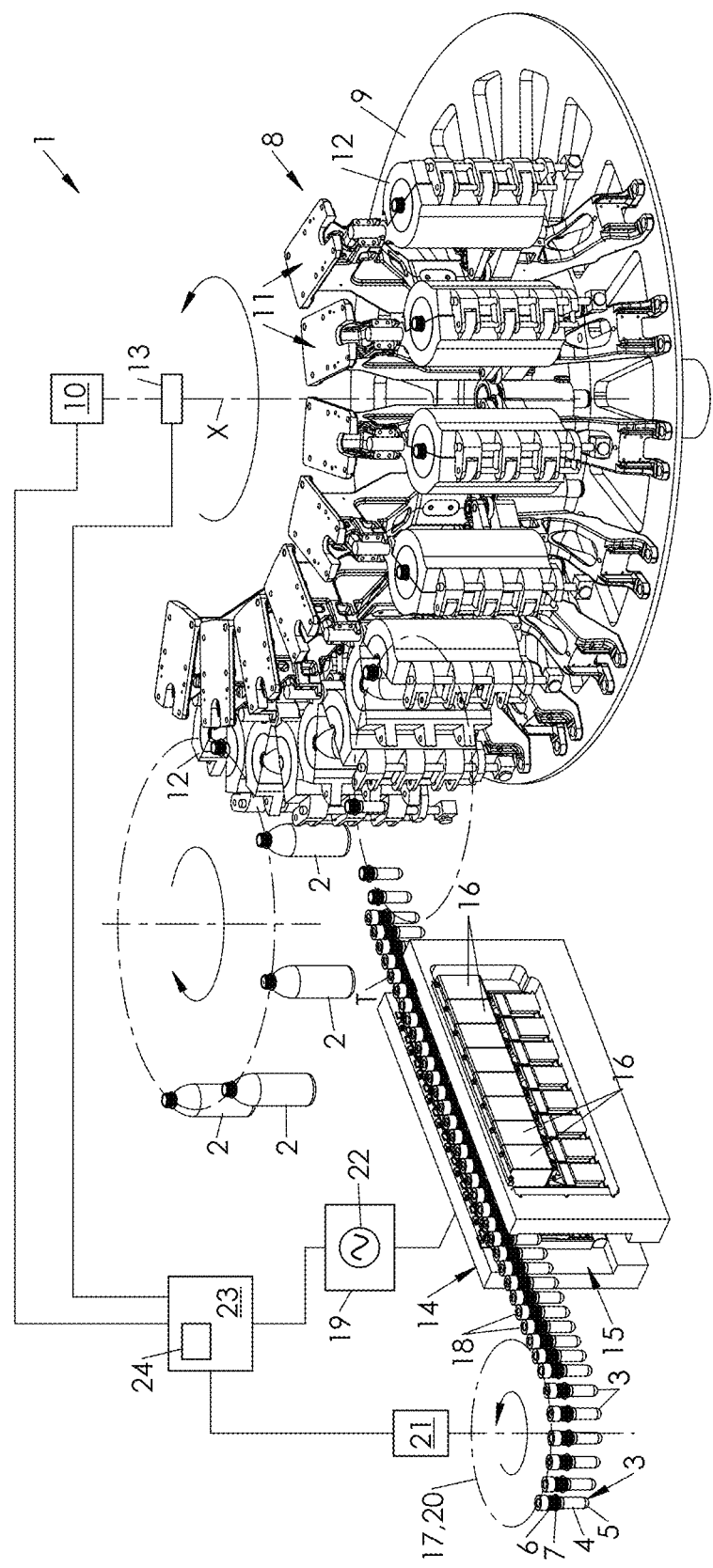
FIG. 1 is a diagrammatic perspective view of a facility for the production of containers from blanks made of plastic material.

FIG. 1 shows a facility 1 for the production of containers 2 from blanks 3 made of plastic material.

In the illustrated embodiment, the blanks 3 are rough injection preforms, which each comprise a body 4, a bottom 5 that closes the body 4 at a lower end, and an open neck 6 (whose shape is definitive) that extends the body 4 at an upper end. The body 4 and the neck 6 are separated by a collar 7 by which the blank 3 and the container 2 that is obtained therefrom can be suspended, as will become apparent below.

As a variant, the blanks 3 could be intermediate containers that are obtained from preforms (for example, following pre-blow molding) but whose shape is not definitive and which are intended to undergo finishing operations (for example, blow molding).

In the following description, the blanks 3 are arbitrarily preforms, but this embodiment is not limiting.

The facility 1 defines a travel path T of the preforms 3 and containers 2. This path T follows trajectory elements that are defined by the different components of the facility 1. The terms "upstream" and "downstream" are defined by reference to the direction of movement of the preforms 3.

In the first place, the facility 1 comprises a forming unit 8 that is equipped with a rotating carrousel 9 that is driven in rotation around a shaft X by a motor 10 and with a series of forming stations 11 mounted on the carrousel 9. For the sake of clarity, only a part of the forming stations 11 is shown in FIG. 1.

Each forming station 11 includes a mold 12 bearing the impression of a container model and a device for injecting a pressurized fluid (typically air) into the previously heated preforms 3.

According to an embodiment that is illustrated in the drawings, each mold 12 is of the portfolio type and comprises a pair of half-molds that are articulated around a common hinge between:
- An open position (in the center in FIG. 1) in which the half-molds are separated to make possible the evacuation of a formed container 2, and then the insertion of a new, previously heated preform 3, and
- A closed position (to the right in FIG. 1) in which the half-molds are contiguous to form together the impression of the model of the container that is to be formed.

The motor 10 that drives the carrousel 9 is, for example, a torque motor, i.e., a brushless permanent magnet servomotor (also called a permanent magnet synchronous motor, or else a brushless dc motor), of the type comprising a rotor that is integral with the carrousel and a peripheral stationary stator.

The forming unit 8 is also equipped with a coder 13, mounted on the shaft X, that provides angular information from which instantaneous speed, denoted $\omega(t)$, for rotation of the carrousel 9, can be derived.

At the full production rate (stabilized), the carrousel 9 rotates at a so-called nominal (also stabilized) speed of rotation, denoted $\omega_N$.

In the second place, the facility 1 comprises a unit 14 for heating preforms 3, located on the travel path T upstream from the forming unit 8.

This heating unit 14, also referred to as "furnace," defines a heating cavity 15 into which the preforms 3 pass. The furnace 14 is equipped with:
- A series (and, for example, two rows opposite) of adjacent emitters 16 that border the cavity 15 and that each comprise a number of electromagnetic radiation sources,
- A drive system 17 of the preforms 3, synchronized with the carrousel 9 and comprising a number of individual supports 18 for the preforms 3;
- A power feed 19 that provides the emitters 16 with electrical power.

According to an embodiment, the drive system 17 comes in the form of a chain that is equipped with links that each carry a support 18 (called a spinner) in which a preform 3 is suspended. This chain 17 travels on wheels 20, at least one of which is driven either by a motor 21 (as illustrated in FIG. 1), which is in this case synchronized with the carrousel 9, or by the carrousel 9 itself, to which the wheel 20 is then connected to by, for example, a belt.

The sources of each emitter 16 are selected to emit a monochromatic radiation, in the infrared range.

In theory, a monochromatic source is an ideal source that emits a single-frequency sinusoidal wave. In other words, its frequency spectrum consists of a single line of zero spectral width (Dirac).

In practice, such a source does not exist, a real source having a frequency emission spectrum that extends over a small but non-zero spectral bandwidth, centered on a main frequency where the intensity of the radiation is maximum. For the requirements of this application, such a real source is considered to be monochromatic. Likewise, for the requirements of this description, a multi-mode source is considered to be monochromatic, i.e., emitting on a discrete spectrum that comprises several narrow bands centered on distinct main frequencies.

The advantage of a monochromatic radiation is that, properly selected, it can be concentrated on one (or more) frequency(ies) for which the thermal behavior of the material of the preforms 3 is, in terms of absorption, particularly advantageous.

By way of example, to ensure fast surface heating of the preforms 3, it is possible to select one (or more) frequency(ies) in the infrared for which the material is very absorbent. In contrast, to ensure a slower but more homogeneous heating in the thickness of the preforms 3, it is possible to select one (or more) frequencies for which the material is relatively less absorbent.

In practice, the sources with which the emitters 16 are equipped are lasers (for example, laser diodes), emitting in the infrared and organized by juxtaposition and superposition to form one or more matrices.

In this specific case, each matrix can be a laser diode matrix with a vertical cavity surface emitting laser (VCSEL), with each diode emitting, for example, a laser beam with a unit power on the order of 1 watt with a wavelength of approximately 1 μm.

These sources are radiant, i.e., the radiation that is emitted is transmitted to the preforms 3 without air being used as a transmission vector.

The sources convert the electrical power that is provided to them into an electromagnetic field that is radiated into the cavity.

This power can be variable. Thus, as illustrated in FIG. 1, for (or in) the power feed 19, the furnace 14 advantageously comprises a power variable-speed drive unit 22. This variable-speed drive unit 22 can be analog or electronic.

By assuming that the emitters 16 offer a yield (denoted R) that can be considered to be essentially constant, the instantaneous power (denoted $P_C(t)$) of the electromagnetic field that is radiated by the emitters 16 is linked by a proportionality equation to the electrical power (denoted $P(t)$) that is provided to them:

$$P_C(t) = R \cdot P(t)$$

The electrical power that is provided to the emitters 16 has a non-zero nominal value $P_N$, corresponding to the power that is required at a full production rate, and a minimal value $P_0$ that can be zero.

A nominal electromagnetic power $P_{CN}$ radiated by the emitters 16 corresponds to the nominal power $P_N$ that is provided:

$$P_{CN} = R \cdot P_N$$

The nominal electromagnetic power $P_{CN}$ is the power that, in the steady-state mode (i.e., at the full production rate), is to be radiated by the emitters 16 to ensure that at the outlet of the cavity 15, each preform 3 has an acceptable temperature profile making it possible to form a container 2 of acceptable quality.

Likewise, a minimum electromagnetic power that is denoted $P_{C0}$ that is radiated by the emitters 16:

$$P_{C0} = R \cdot P_0$$

corresponds to the minimum power $P_0$ that is provided.

Since the electrical power $P(t)$ that is provided (and therefore the electromagnetic power $P_C(t)$) is not zero, the emitters 16 are in a so-called "lit" state, i.e., the sources emit radiation into the cavity 15.

In contrast, $P_{C0}$ is zero if $P_0$ is zero. In this case, the emitters 16 are in a so-called "extinguished" state, i.e., its sources do not emit any radiation into the cavity 15.

The variable-speed drive unit 22 makes it possible to regulate the instantaneous electrical power $P(t)$ that is provided with a fraction of the nominal electrical power $P_N$:

$$P(t) = K \cdot P_N$$

where K is a proportionality coefficient, a positive real number or zero (corresponding to extinction in this latter case), associated with emitters 16.

In the third place, the facility 1 comprises a control unit 23 (electronic or computer) that is connected to the forming unit 8 and to the furnace 14, of which it controls, respectively, the speed of rotation of the carrousel 9 and the electrical power provided to the emitters 16.

More specifically, the control unit 23 is connected to the motor 10 of the forming unit 8 and delivers to it electrical power to which the speed of rotation of the carrousel 9 is proportional (which speed, however, is affected by a response time because of its inertia).

Furthermore, the control unit 23 is connected to the power feed 19 of the furnace 14, whose variable-speed drive unit 22 it controls in order to modulate the electrical power provided to the emitters 16.

According to an embodiment that is illustrated in FIG. 1, the control unit 23 is connected to the motor 21 of the drive system 17 of the furnace 14, to which it delivers electrical power.

The control unit 23 has a memory 24 in which the following are recorded:

For the carrousel 9, a speed setpoint that corresponds to the nominal speed $\omega_N$ of rotation of the carrousel 9, and For the furnace 14, a power setpoint that corresponds to the nominal electrical power $P_N$. The control unit 23 is programmed, from a stopped configuration in which the carrousel 9 is stationary:

For controlling the rotation of the carrousel 9 according to the nominal speed setpoint $\omega_N$, During the acceleration of the carrousel 9:

Taking into account a real instantaneous speed $\omega(t)$ of rotation of the carrousel 9, Upon command from the control unit 23, regulating the electrical power of the feed 19 to an instantaneous value $P(t)$ such that:

$$P(t) = P_N \cdot \frac{\omega(t-T)}{\omega_N}$$

where T, a positive real number or zero, corresponds to a possible lag between the power $P(t)$ and the speed $\omega(t)$ of rotation of the carrousel 9.

Figure 2:
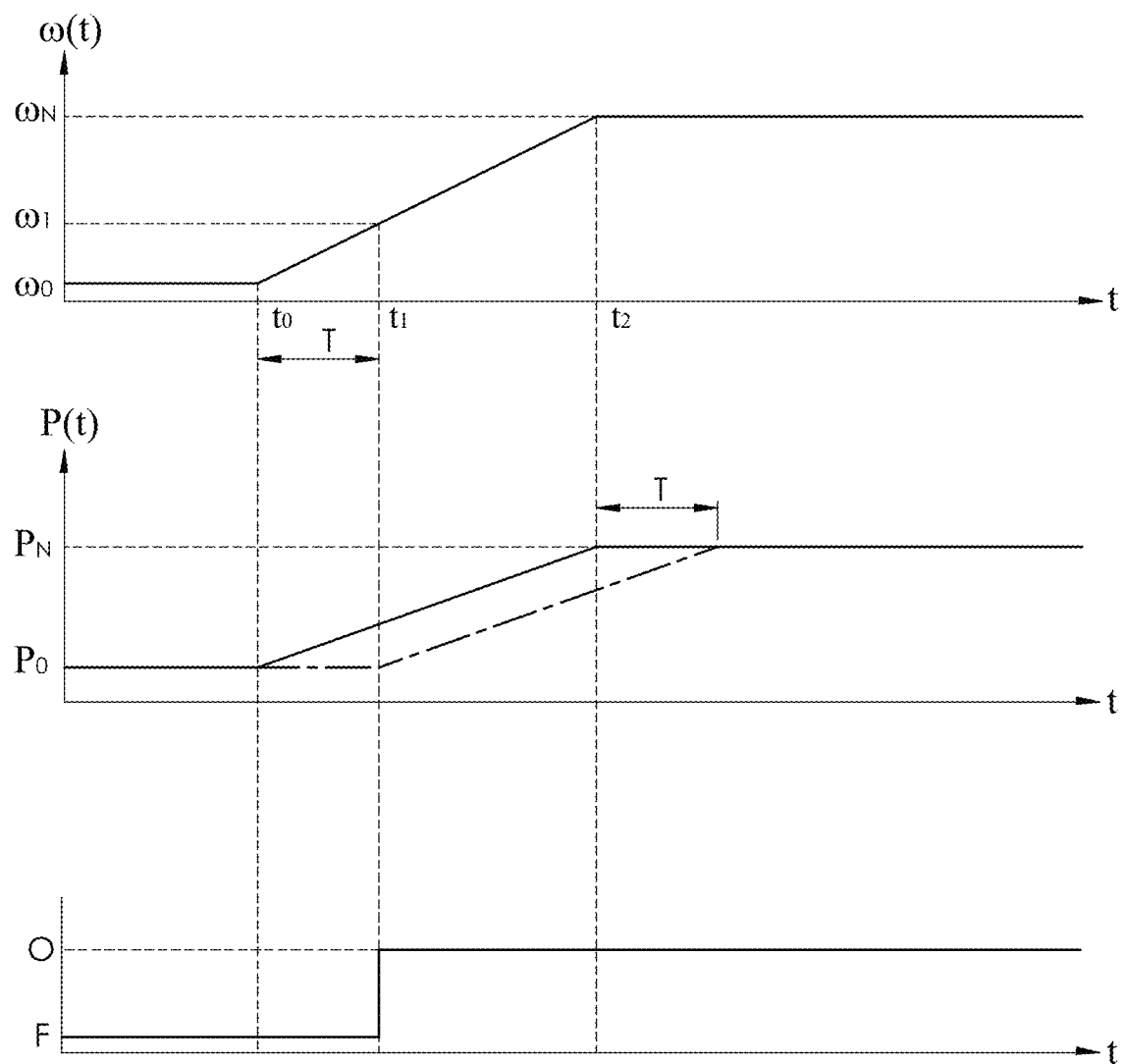
FIG. 2 is a diagram on which are traced, at the top, a curve that illustrates the rise in speed of the carrousel upon start-up of the production; in the middle, a curve that illustrates the powering-up of the heating unit; at the bottom, a timetable that illustrates the command for opening the feed device.

As we have mentioned, the carrousel 9 has an inertia such that its real instantaneous speed $\omega(t)$ (measured by the coder 13, which transmits the measurement to the control unit 23), starting from an initial value $\omega_0$ (value of the speed $\omega(t)$ at an initial time $t_0$) does not immediately reach the setpoint $\omega_N$, but undergoes an acceleration, as illustrated by the top curve in FIG. 2. In the illustrated example, the acceleration is linear, which does not necessarily correspond to reality but is adequate for illustrating the phenomenon.

Rather than wait, in launching production, for the instantaneous speed $\omega(t)$ of rotation of the carrousel 9 to have reached the setpoint $\omega_N$ (at a time $t_2$), it is proposed to turn on the emitters 16 and to launch production immediately (T=0, curve in solid lines in the center of FIG. 2) or with little lag (T>0, curve in broken lines in FIG. 2), while adapting the instantaneous electrical power P(t) to the instantaneous speed $\omega(t)$ of the carrousel 9.

Actually, it is possible to note that the amount of energy received by the preforms 3 is directly proportional to their exposure time in the cavity 15 and to the electrical power provided to the emitters 16.

This relationship is due to the absence of thermal inertia of the emitters 16, which instantaneously radiate the electromagnetic power $P_c(t)$ that is obtained from the electrical power P(t) that is provided, in proportion to their yield, according to the equation that was already cited:

$$P_c(t)=R \cdot P(t)$$

Since the emitters 16 have no thermal inertia, it is consequently possible to slave the instantaneous electrical power P(t) that is provided to the instantaneous real speed $\omega(t)$ of rotation of the carrousel 9.

More specifically, the same proportion factor connects the instantaneous electrical power P(t) to the nominal power $P_N$, on the one hand, and the instantaneous real speed $\omega(t)$ to the nominal speed $\omega_N$, on the other hand:

$$\frac{P(t)}{P_N} = \frac{\omega(t)}{\omega_N}$$

This is why the control unit 23 commands a gradual increase in the instantaneous electrical power P(t) that is provided to the emitters 16 in proportion to the instantaneous real speed $\omega(t)$ of the carrousel 9 (if necessary with an offset T), until reaching the nominal power $P_N$ when the speed $\omega(t)$ reaches the speed $\omega_N$, which corresponds to the full rate.

During the entire acceleration of the carrousel 9 and the increase in the power that is provided to the furnace 14 (and therefore radiated in the cavity 15), the preforms 3 receive a constant amount of energy, which makes it possible to produce containers 2 with a constant quality, even under transient conditions.

The result is an increase in the effective productivity of the facility 1, without it being necessary to modify it substantially (for example, by replacing the motor 10 of the carrousel by a more powerful motor that can more quickly reach the nominal speed to shorten the transient start-up phase).

Figure 3:
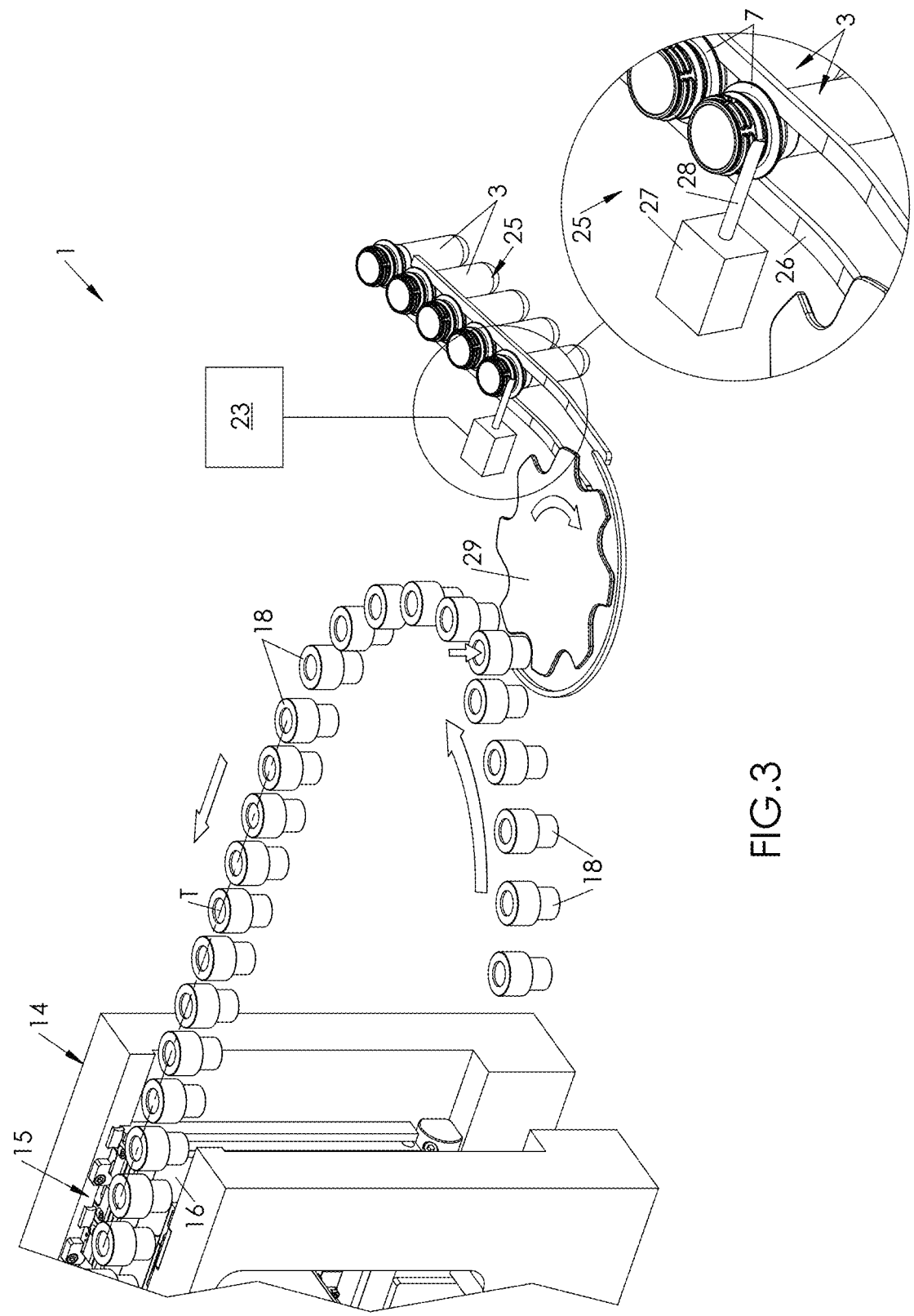
FIG. 3 is a partial perspective view, following another orientation, of the facility of FIG. 1, with, in an inset, a detail on a larger scale that is centered on the feed device that is placed in a closed state.
Figure 4:
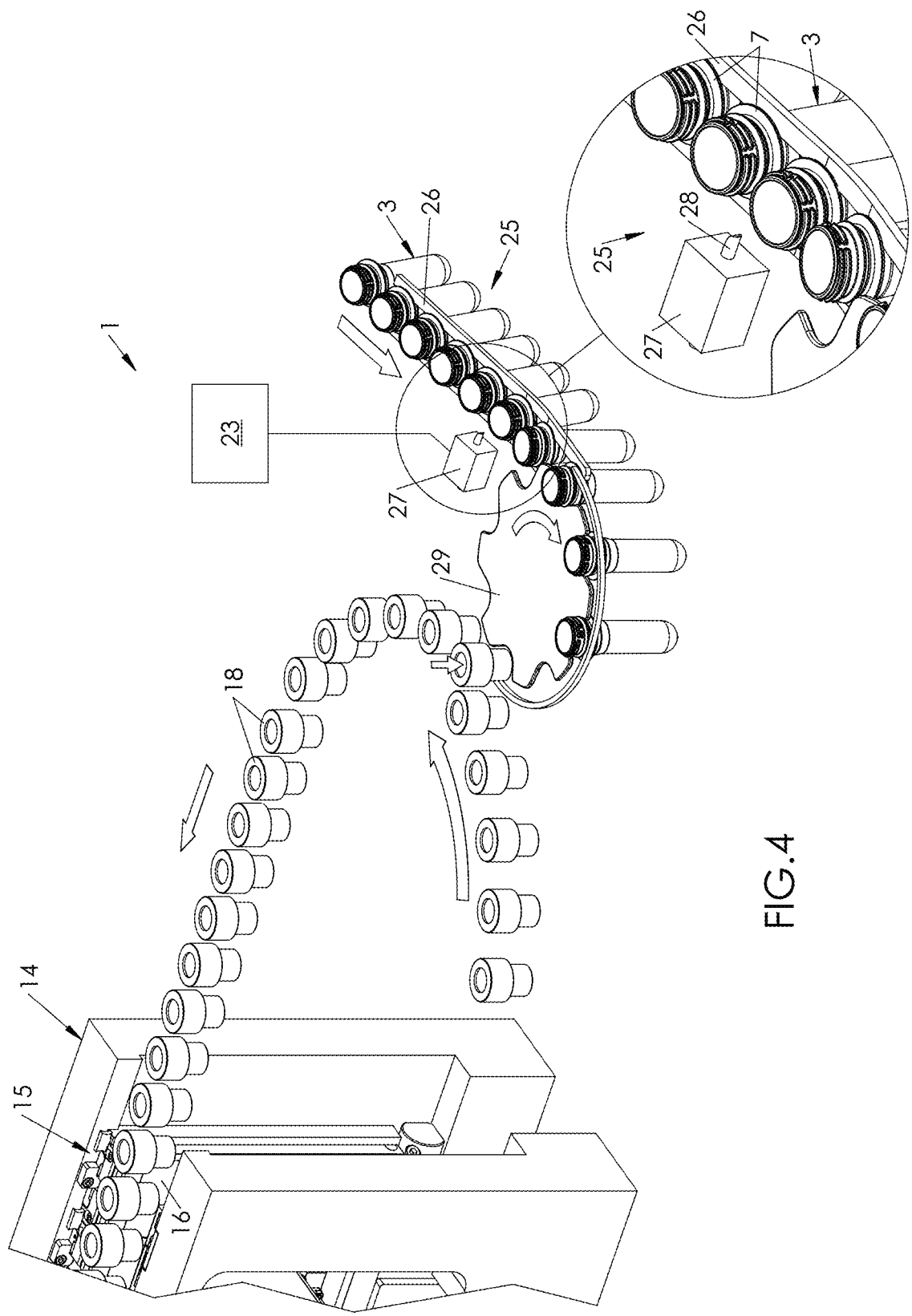
FIG. 4 is a view that is similar to FIG. 3, illustrating the opening of the feed device.

According to an embodiment that is illustrated in FIG. 3, FIG. 4, and FIG. 5, the facility 1 comprises a device 25 for feeding the furnace 14 with preforms 3.

As can be seen in particular in FIG. 5, upstream from the furnace 14, the preforms 3 move by gravity on a transport rail 26 on which they are suspended by their collars 7.

At a downstream end of the rail 26, the feed device 25 comprises an actuator 27 that is equipped with a rod 28 that can move between:

A deployed position (corresponding to a closed state of the feed device 25, FIG. 3), in which the rod 28 forms a barrier to the preforms 3 to prevent them from advancing, and A retracted position (corresponding to an open state of the feed device 25, FIG. 4 and FIG. 5) in which the rod 28 is separated from the path of the preforms 3 to make it possible for them to advance freely, so that they are picked up by a gearwheel 29 for transfer and rounding-up.

The actuator 27 is guided by the control unit 23, to which it is connected.

More specifically, the control unit 23 can be programmed to control the opening of the feed device 25 under conditions, in particular based on the instantaneous speed $\omega(t)$ of rotation of the carrousel 9.

Thus, according to a particular mode of rotation, the control unit 23 is programmed for:

As long as the real speed $\omega(t)$ of rotation of the carrousel 9 is less than a threshold value $\omega_1$ (reached at an intermediate time $t_1$ between $t_0$ and $t_2$) of between 15% and 50% of the setpoint $\omega_N$, keeping the feed device 25 closed (state F on the timetable on the bottom in FIG. 2);

As soon as the real speed $\omega(t)$ of rotation of the carrousel 9 reaches the threshold value $\omega_1$, controlling the opening (state O on the timetable of FIG. 2) of the feed device 25.

In this way, it is possible to select the time at which the production starts up, certainly without waiting for the carrousel 9 to have reached its nominal speed, but also in waiting for it to have reached an adequate speed to make possible the forming of the containers 2 by reducing in particular the duration of transfers of preforms 3, during which the material has a tendency to cool down.

In the example that is illustrated in broken lines on the central curve of FIG. 2, where the lag T is not zero, this offset T corresponds to the gap between the initial time $t_0$ and the intermediate time $t_1$:

$$T=t_1-t_0$$

This lag, which remains small (it is counted in seconds), makes it possible to limit energy consumption by delaying the turning on of the furnace 14 until the feed device 25 is effectively open.

The invention claimed is:

1. Facility (1) for the production of containers (2) from blanks (3) made of plastic material, which facility defines a travel path (T) of the blanks (3) and containers (2), and which comprises:

A forming unit (8) equipped with a rotating carrousel (9) driven by a motor (10) and with a series of forming stations (11) mounted on the carrousel (9) and each including a mold (12) bearing the impression of a container and a device for injection of a pressurized fluid into the blanks (3);

A unit (14) for heating blanks (3), located on the travel path (T), upstream from the forming unit (8) and defining a heating cavity (15), with this heating unit (14) being equipped with:

A series of adjacent emitters (16) bordering the cavity (15) and each comprising a number of monochromatic radiation sources that emit in the infrared, A drive system (17) of the blanks (3), synchronized with the carrousel (9) and comprising a number of individual supports (18) for the blanks (3);

A power feed (19) providing each emitter (16) with electrical power;

A control unit (23) connected to the motor (10) of the forming unit (8) and the feed of the heating unit (14), with this control unit (23) having a memory (24) in which the following are recorded: a nominal speed setpoint $\omega_N$ of the rotation of the carrousel (9) and a nominal electrical power setpoint $P_N$, where both correspond to a nominal production rate, with this facility (1) being characterized in that the control unit (23) is programmed, from a stopped configuration in which the carrousel (9) is stationary:

For controlling the rotation of the carrousel (9) according to the nominal speed setpoint $\omega_N$, During the acceleration of the carrousel (9):
Taking into account a real instantaneous speed $\omega(t)$ of rotation of the carrousel (9),
Regulating the electrical power of the feed (19) to an instantaneous value P(t) such that:

$$P(t) = P_N \cdot \frac{\omega(t-T)}{\omega_N}$$

where T is a positive real number or zero.

2. Facility (1) according to claim 1, characterized in that it comprises a device (25) for feeding the heating unit (14) with blanks (3), suitable for adopting an open state in which the passage of the blanks (3) toward the heating unit (14) is free, and a closed state in which the passage of the blanks (3) toward the heating unit (14) is blocked, with the control unit (23) being programmed for:

As long as the real speed of rotation of the carrousel (9) is less than a threshold value of between 15% and 50% of the setpoint, keeping the feed device (25) closed;

As soon as the speed of rotation of the carrousel (9) reaches the threshold value, controlling the opening of the feed device (25).

3. Method for the production of containers (2) from blanks (3) made of plastic material, within a production facility (1) that defines a travel path (T) for blanks (3) and containers (2) and that comprises:

A forming unit (8) that is equipped with a rotating carrousel (9) driven by a motor (10) and with a series of forming stations (11) mounted on the carrousel (9) and each including a mold (12) bearing the impression of a container and a device for injection of a pressurized fluid into the blanks (3);

A unit (14) for heating blanks (3), located on the travel path (T), upstream from the forming unit (8) and defining a heating cavity (15), with this heating unit (14) being equipped with:
A series of adjacent emitters (16) bordering the cavity (15) and with each comprising a number of monochromatic radiation sources that emit in the infrared,
A drive system (17) of the blanks (3), synchronized with the carrousel (9) and comprising a number of individual supports (18) for the blanks (3);
A power feed (19) providing each emitter (16) with electrical power;
A control unit (23) connected to the motor (10) of the forming unit (8) and to the feed of the heating unit (14), with this control unit (23) having a memory (24) in which the following are recorded: a nominal speed setpoint $\omega_N$ of the rotation of the carrousel (9) and a nominal electrical power setpoint $P_N$, where both correspond to a nominal production rate;

with this method being characterized in that it comprises the following operations, starting from a stopped configuration of the facility (1), in which the carrousel (9) is stationary:

Controlling by the control unit (23) the rotation of the carrousel (9) according to the nominal speed setpoint $\omega_N$, During the acceleration of the carrousel (9):
Measuring a real instantaneous speed $\omega(t)$ of rotation of the carrousel (9),
Upon the command of the control unit (23), regulating the electrical power of the feed (19) to an instantaneous value P(t) such that:

$$P(t) = P_N \cdot \frac{\omega(t-T)}{\omega_N}$$

where T is a positive real number or zero.

4. Method according to claim 3, characterized in that with the facility (1) being equipped with a device (25) for feeding the heating unit (14) with blanks (3), suitable for adopting an open state in which the passage of the blanks (3) toward the heating unit (14) is free, and a closed state in which the passage of the blanks (3) toward the heating unit (14) is blocked, the following operations are also provided:

As long as the real speed of rotation of the carrousel (9) is less than a threshold value of between 15% and 50% of the setpoint, keeping the feed device (25) closed;

As soon as the speed of rotation of the carrousel (9) reaches the threshold value, controlling the opening of the feed device (25).

* * * * *